United States Patent
Barger et al.

(10) Patent No.: US 11,049,623 B2
(45) Date of Patent: Jun. 29, 2021

(54) RESISTANCE PRESSURE WELD FOR NUCLEAR REACTOR FUEL ROD TUBE END PLUG

(71) Applicant: BWXT mPower, Inc., Charlotte, NC (US)

(72) Inventors: Earl Brian Barger, Goode, VA (US); Scott L. Fitzner, Appomattox, VA (US); Jeffrey T. Lee, Blacksburg, VA (US); Roger D. Ridgeway, Lynchburg, VA (US)

(73) Assignee: BWXT mPower, Inc., Charlotte, NC (US)

( * ) Notice: Subject to any disclaimer, the term of this patent is extended or adjusted under 35 U.S.C. 154(b) by 0 days.

(21) Appl. No.: 16/562,986

(22) Filed: Sep. 6, 2019

(65) Prior Publication Data

US 2020/0051703 A1 Feb. 13, 2020

Related U.S. Application Data

(62) Division of application No. 15/290,628, filed on Oct. 11, 2016, now Pat. No. 10,410,754.

(51) Int. Cl.
*G21C 3/10* (2006.01)
*B23K 11/00* (2006.01)
(Continued)

(52) U.S. Cl.
CPC ............. *G21C 3/10* (2013.01); *B23K 11/002* (2013.01); *B23K 11/093* (2013.01);
(Continued)

(58) Field of Classification Search
CPC ..... B23K 11/00; B23K 11/002; B23K 11/093; B23K 2201/00; B23K 2201/06
See application file for complete search history.

(56) References Cited

U.S. PATENT DOCUMENTS 3,045,108 A 7/1962 Stone et al.
3,444,351 A 5/1969 Stehle et al.
(Continued)

FOREIGN PATENT DOCUMENTS

CA 1189361 A 6/1985
CN 85101508 A 1/1987
(Continued)

OTHER PUBLICATIONS

Extended European Search Report, EP Application No. 17890828, dated Apr. 14, 2020, 8 pages.
(Continued)

*Primary Examiner* — Lily C Garner
(74) *Attorney, Agent, or Firm* — Nelson Mullins Riley & Scarborough LLP

(57) ABSTRACT

A fuel rod for a nuclear reactor, including a cladding tube having a first end with an annular end face, a second end with an annular end face, and a cylindrical body portion extending therebetween, and a first tube end plug including a front portion, an annular lip with an annular end face, and a substantially straight cylindrical body portion extending therebetween, wherein the surface area of the annular end face of the first end of the cladding tube and the annular end face of the annular lip of the first tube end plug are substantially equal, and the annular end face of the first end of the cladding tube and the annular end face of the annular lip of the first tube end plug are connected by a resistance pressure weld.

5 Claims, 8 Drawing Sheets

(51) Int. Cl.
  *B23K 11/093* (2006.01)
  *B23K 33/00* (2006.01)
  *G21C 21/02* (2006.01)
  *B23K 101/06* (2006.01)

(52) U.S. Cl.
  CPC ............ *B23K 33/006* (2013.01); *G21C 21/02* (2013.01); *B23K 2101/06* (2018.08); *Y02E 30/30* (2013.01)

(56) References Cited

U.S. PATENT DOCUMENTS

| | | |
|---|---|---|
| 3,528,166 A | 9/1970 | Portal et al. |
| 3,725,635 A | 4/1973 | Fink et al. |
| 4,097,712 A | 6/1978 | Bezold |
| 4,642,217 A | 2/1987 | Wilson et al. |
| 4,820,478 A | 4/1989 | Freeman |
| 4,865,804 A | 9/1989 | McGeary et al. |
| 4,921,663 A | 5/1990 | Boatwright |
| 5,159,174 A | 10/1992 | Yeo |
| 5,251,247 A | 10/1993 | Sahlin et al. |
| 5,282,233 A | 1/1994 | Bryan |
| 5,374,800 A | 12/1994 | Yoneda |
| 5,401,933 A | 3/1995 | Yoneda |
| 5,513,230 A | 4/1996 | Crede et al. |
| 6,014,418 A | 1/2000 | Isobe et al. |
| 6,379,485 B1 | 4/2002 | Borglum |
| 7,424,085 B2 | 9/2008 | Hertz et al. |
| 8,107,585 B2 | 1/2012 | Blaudin de the |
| 9,793,020 B2 | 10/2017 | Cho et al. |
| 10,410,754 B2 | 9/2019 | Barger et al. |
| 2003/0016777 A1 | 1/2003 | Vandergheynst et al. |
| 2008/0013667 A1 | 1/2008 | Oh et al. |
| 2010/0266094 A1 | 10/2010 | Kim et al. |
| 2011/0051876 A1 | 3/2011 | Ahlfeld et al. |
| 2011/0182396 A1 | 7/2011 | Park et al. |
| 2013/0272484 A1 | 10/2013 | Lee et al. |
| 2014/0190943 A1* | 7/2014 | Cho .................... B23K 11/093 219/78.01 |
| 2017/0206984 A1 | 7/2017 | Lee et al. |
| 2019/0299323 A1* | 10/2019 | Sasaki .................... F16B 5/08 |

FOREIGN PATENT DOCUMENTS

| | | |
|---|---|---|
| DE | 2826748 A1 | 12/1979 |
| JP | H101237490 A | 9/1989 |
| JP | H102176598 A | 7/1990 |
| JP | H108122472 A | 5/1996 |
| JP | H108209305 A | 8/1996 |
| JP | 2013018022 A | 1/2013 |
| NL | 7205217 A | 10/1973 |
| WO | 2003/009307 A1 | 1/2003 |
| WO | 2013/087869 A1 | 6/2013 |
| WO | 2013/165525 A2 | 11/2013 |

OTHER PUBLICATIONS

Advanced Fuel Pellet Materials and Fuel Rod Design for Water Cooled Reactors, IAEA-TECDOC-1654 (Nov. 2009).
Bottcher, J. et al., "ODS Steel Clad MOX Fuel-Pin Fabrication and Irradiation Performance in EBR-II," Nuclear Technology, vol. 138:238-245 (2002).
Bottcher, J. et al., Inoue (2002) ODS Steel Clad MOX Fuel-Pin Fabrication and Irradiation Performance in EBR-II, Nuclear Technology, 138:3, 238-245, DOI:10.13182/NT02-A3291( downloaded on Dec. 13, 2018 at URL: https://doi.org/10.13182/NT02-A3291)(Year: 2002).
E Wang, et al., "Research on Defects of Pressure Resistance Welding for HWR Fuel Element", (pp. 83-94.
GE Nuclear Energy, GEFR-00793, PRISM Preliminary Safety Information Document, Nov. 1986 (downloaded on Dec. 14, 2018 at URL:https://www.nrc.gov/docs/ML0828/ML082880400.pdf) (Year: 1986) 547 pages.
International Search Report and Written Opinion, PCT/US2017/56136, dated Jun. 20, 2018, 10 pages.
IZNA7 Special Topic Report 2007—Welding of Zirconium Alloys (pp. 2-9 and 2-10).
Kim, Soo-Sung, et al. "Effect of heat on the soundness of zircaloy-4 end cap closure using a resistance upset welding." Journal of Nuclear science and technology 47.3 (2010): 262-268.
Lee, et al., "End Cap for Nuclear Fuel Rod and Welding Thereof", U.S. Appl. No. 15/205,944, filed Jul. 8, 2016, 30 pages.
M. Benjamin, "Temperature Distributions in End Caps of Cylindrical Reactor Fuel Elements", Nuclear Structural Engineering 1 (pp. 259-264) (Jan. 15, 1965).
N. Jerred, et al., "Pressure Resistance Welding of High Temperature Metallic Materials", ANS Decomissioning, Decontamination & Reutilization Conference (Aug. 2010).
Seki, M., et al. "Pressurized resistance welding technology development in 9Cr-ODS martensitic steels." Journal of nuclear materials 329 (2004): 1534-1538.
W. Kanne, Jr., et al, "Development of Resistance Welding Methods for Tritium Containment," Proceedings of the Symposium, Savannah River Site 50th Anniversary, May 17, 2000 (pp. 201-206).
Zirker, L. et al., "Fabrication of Oxide Dispersion Strengthened Ferritic Clad Fuel Pins," International Conference on Fast Reactors and Related Fuel Cycles, Oct. 28-31, 1991, Kyoto Japan.

\* cited by examiner

RESISTANCE PRESSURE WELD FOR NUCLEAR REACTOR FUEL ROD TUBE END PLUG

CLAIM OF PRIORITY

This application is a division of U.S. application Ser. No. 15/290,628 filed on Oct. 11, 2016, now U.S. Pat. No. 10,410,754, which disclosure is hereby incorporated by reference in its entirety.

This invention was made with Government support under Contract No. DE-NE0000583 awarded by the Department of Energy. The Government has certain rights in this invention.

FIELD OF THE INVENTION

The present invention relates generally to fuel rods for use with fuel assemblies of nuclear reactors. More particularly, the present invention relates to a tube end plug for a fuel rod and a resistance pressure welding method for connecting same to a cladding tube of the fuel rod.

BACKGROUND OF THE INVENTION

In a typical nuclear reactor, the reactor core includes a number of fuel assemblies, each of which is made up of an array of fuel rods 2, as shown in FIG. 10. Each fuel rod 2 often includes a tubular cladding 4 containing fuel pellets (not shown) composed of fissile material, and the cladding tube is sealed by upper and lower tube end caps or plugs 6. The nuclear reactor core is made up of an array of such fuel rods 2, and is disposed in a pressure vessel containing primary coolant (typically water, although heavy water or another coolant is also contemplated). The primary coolant flows through the nuclear reactor core and is heated by the radioactive core. In a typical boiling water reactor (BWR) configuration, the heated coolant boils to form primary coolant steam that is piped out of the pressure vessel and used to drive one or more turbines. In a typical pressurized water reactor (PWR) configuration, the primary coolant remains in a subcooled state and is piped through steam generators located outside of the vessel to heat secondary coolant that drives one or more turbines. In a variant integral PWR configuration, the steam generators are located inside the pressure vessel and the secondary coolant is pumped into the steam generators.

As noted, each fuel rod 2 typically includes a column of nuclear fuel pellets loaded into a cladding tube 4, and tube end plugs 6 secured to the opposite ends of the cladding tube 4. The end plugs 6 should provide a reliable seal to prevent leakage of primary coolant into the fuel rods 2. In known approaches, the top and bottom end plugs 6 are girth or butt welded to the opposite ends of the tube 4, for example by fusion welding or solid state welding.

Resistance welding of tube end plugs 6 to cladding tubes 4 is also known wherein the cladding tube 4 is butted against the end plug 6 and a controlled high current, typically alternating current (AC), is passed between the cladding tube 4 and the end plug 6 which is compressively loaded. Resistance at the interface between the end plug 6 and the cladding tube 4 generates localized heating resulting in a diffusion bond. While resistance welding has many desirable attributes, the process has some shortcomings. For example, for those nuclear reactors that operate at "high temperatures" (500 C-° to 950 C°), the use of special materials, such as martensitic stainless steel, oxide dispersion strengthened alloys (ODS), etc., may be required for construction of the fuel rod's cladding tube and tube end plugs. Although those materials provide enhanced performance characteristics with regard to operation of the fuel rods, they are known to be difficult to weld resulting in undesirable weld properties that may lead to weld failures at an unacceptable rate. Often, because the mass of the tube end plug in the vicinity of the weld region is greater than that of the cladding tube, a large temperature differential between the tube and end plug may lead to degraded bond quality. In order to match the mass of the tube end plug 6 to that of the cladding tube 4 in the vicinity of the weld region, it is known to provide a cylindrical recess 7 in the end of the tube end plug 6 so that the wall thickness are more evenly matched. However, a sharp angular transition 8 from the side wall to the bottom wall of such a recess 7 can lead to stress concentrations and, therefore, reduced strength of the weld region.

Moreover, AC welding has some additional drawbacks. For instance, welding with alternating current causes heating and cooling during each cycle. This can be an important distinction for materials requiring longer welding times (>~16 ms). When welding with AC, weld time is increased by increasing the number of AC cycles. Within these cycles the material cools, subsequent heating periods within the cycle must reheat the material and overcome the effects of decreased resistance due to deformation at the weld interface (larger surface area).

The present invention recognizes and addresses the foregoing considerations, and others, of prior art constructions and methods.

SUMMARY OF THE INVENTION

One embodiment of the present disclosure provides a fuel rod for a nuclear reactor including a cladding tube having a first end with an annular end face, a second end with an annular end face, and a cylindrical body portion extending therebetween, and a first tube end plug including a front portion, an annular lip with an annular end face, and a substantially straight cylindrical body portion extending therebetween, wherein the surface area of the annular end face of the first end of the cladding tube and the annular end face of the annular lip of the first tube end plug are substantially equal, and the annular end face of the first end of the cladding tube and the annular end face of the annular lip of the first tube end plug are connected by a resistance pressure weld.

Another embodiment of the present disclosure provides a fuel rod for a nuclear reactor including a cladding tube having a first end with an annular end face, a second end with an annular end face, and a cylindrical body portion extending therebetween, and a first tube end plug including a front portion, a rear face, a substantially straight cylindrical body portion extending therebetween, and an annular undercut extending from the rear face into the cylindrical body portion, the annular undercut including a bottom wall, wherein the bottom wall of the annular undercut defines a continuous curve in a plane that both includes a longitudinal center axis of, and bisects, the fuel rod, and the annular end face of the first end of the cladding tube and the rear face of the first tube end plug are connected by a resistance pressure weld.

Another embodiment of the present disclosure provides a method of performing a resistance pressure weld including the steps of providing a cladding tube having a first end with an annular end face, providing a tube end plug including a front portion, a rear face, a cylindrical body portion extending therebetween, and an annular undercut extending from the rear face into the cylindrical body portion, thereby forming an annular lip having an annular end face, securing a first electrode to the first end of the cladding tube, securing a second electrode to the tube end plug, abutting the annular end face of the cladding tube to the annular end face of the tube end plug, applying compressive force to both the cladding tube and the tube end plug, and applying electric current between the first and the second electrodes so that current flows between the cladding tube and the tube end plug.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which.

Figure 1:
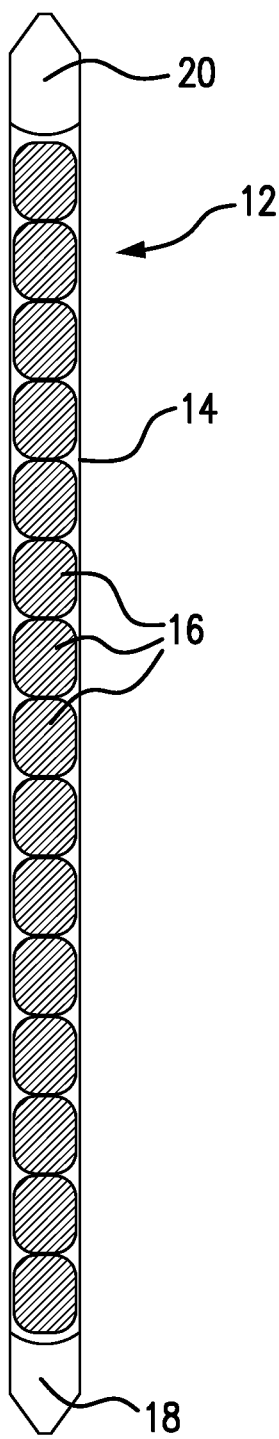
FIG. 1 is a diagrammatic illustration of a fuel rod including upper and lower tube end plugs in accordance with an embodiment of the present disclosure.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring now to the figures, a fuel rod 12 constructed in accordance with the present disclosure is shown. Fuel rod 12 includes a cladding tube 14 containing a stack of fissile material fuel pellets 16, and cladding tube 14 is plugged at its upper and lower ends with lower and upper tube end plugs 18 and 20, respectively. The plugging of the lower end by lower end plug 18, and the upper end by upper end plug 20 includes a resistance weld as disclosed herein. Fuel rod 12 may optionally contain other elements such as spacers not containing fissile material, or containing a reduced concentration of fissile material as compared with the fuel pellets.

Figure 2:
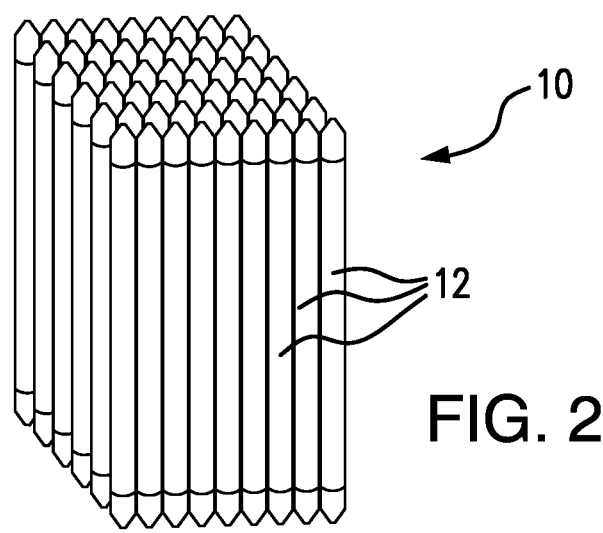
FIG. 2 is a diagrammatic illustration of a nuclear reactor core including a plurality of fuel rods as shown in FIG. 1.

Referring now to FIG. 2, a nuclear reactor core 10 is diagrammatically shown, and includes an array of fuel rods 12. While the illustrative reactor core 10 includes only a 10×10 array of 100 fuel rods, a reactor for generating electrical power may employ thousands or tens of thousands of fuel rods 12, typically arranged in structural groups called fuel assemblies. For example, one contemplated small modular reactor (SMR) design may include up to 69 fuel assemblies each comprising a 17×17 bundle of fuel rods. The fuel rods of each fuel assembly are typically held together by spacer grids welded with guide tubes and upper and lower nozzles or end plates to form the structural skeleton, and a core basket core former, or other structural support contains the fuel assemblies (structural support components not shown).

Figure 3:
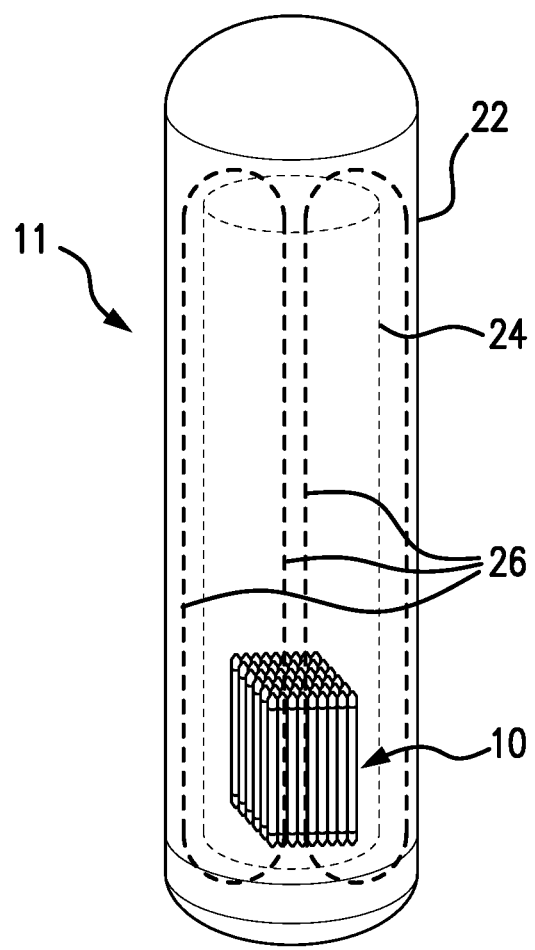
FIG. 3 is a diagrammatic illustration of a nuclear reactor including the nuclear reactor core as shown in FIG. 2.

Referring additionally to FIG. 3, a nuclear reactor 11 is diagrammatically shown, and includes nuclear reactor core 10 disposed in a pressure vessel 22 and immersed in primary coolant water. In the illustrative reactor of FIG. 3, a central riser structure 24 defines primary coolant flow circulation paths 26 which may be driven by natural circulation (that is, convection currents due to heating by reactor core 10) or by internal or external reactor coolant pumps (not shown). Circulation paths 26 entail primary coolant heated by the reactor core 10 flowing upward through the interior plenum of the central riser 24 (the "hot" leg) and back downward to return to the core 10 via a downcomer annulus defined between the pressure vessel 22 and central riser 24 (the "cold" leg). The nuclear reactor optionally includes various other components not shown in FIG. 3, such as control rods and associated control rod drive mechanisms (CRDMs), optional reactor coolant pumps, an internal or external pressurizer, coolant makeup and letdown sub-systems, emergency core cooling systems, an external containment structure, and so forth.

Figure 5:
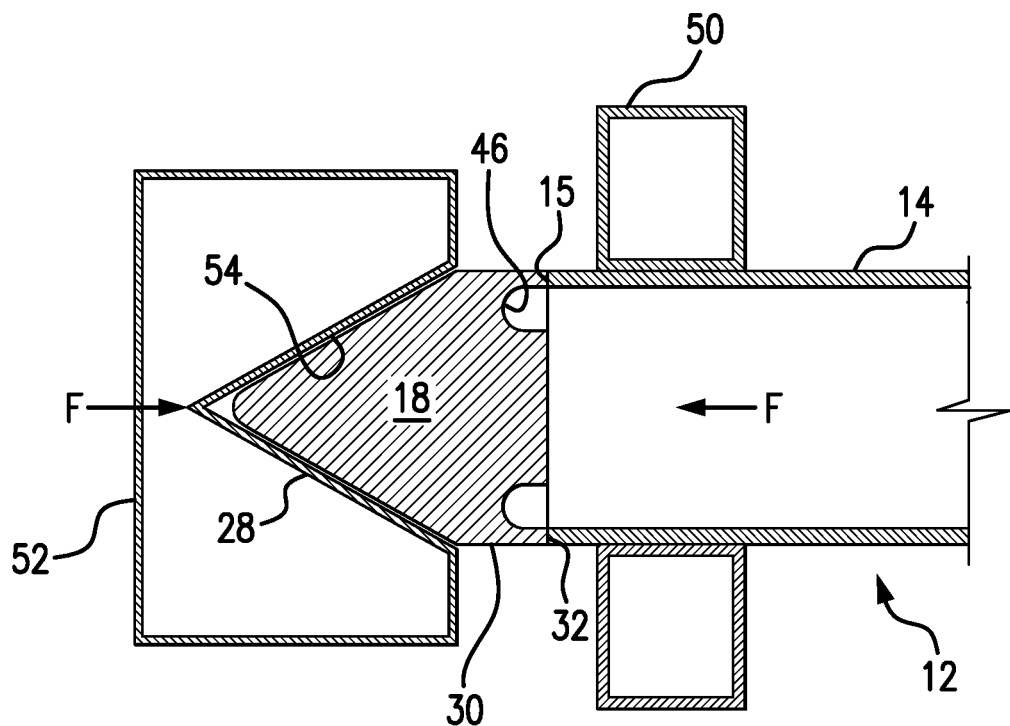
FIG. 5 is a cross-sectional side view of a fuel rod cladding tube and tube end plug as shown in FIG. 4A, undergoing a pressure resistance welding operation.
Figure 6:
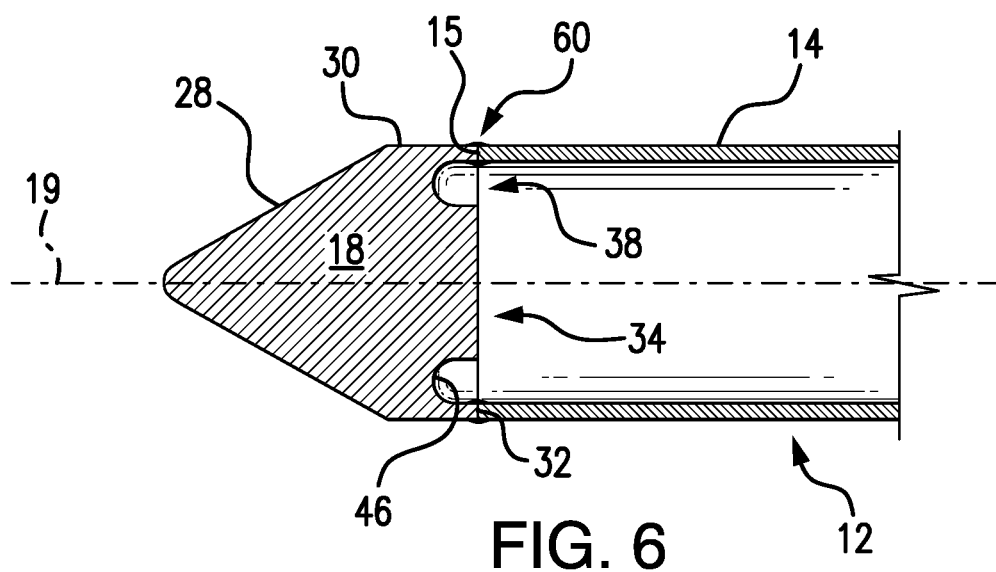
FIG. 6 is a cross-sectional view of the welded fuel rod cladding tube and tube end plug as shown in FIG. 5.

Referring now to FIGS. 4A through 4D, a tube end plug in accordance with the present disclosure is shown. For ease of description, only bottom end plug 18 is presently discussed. As shown, tube end plug 18 including a front portion 28 with a conical outer surface, a rear face 36, a cylindrical main body portion 30 extending therebetween, and an annular undercut 38 that depends inwardly from rear face 36. Preferably, annular undercut 38 is concentric with the cylindrical outer surface of main body portion 30 such that an annular lip 43 and a cylindrical fuel seat 34 are formed in main body portion 30. As shown, fuel seat 34 is defined by annular lip 43 and a portion of rear face 36 of tube end plug 18, and serves as a stop for supporting the stack of fuel pellets 16 (FIG. 1) that are disposed within fuel rod 12. Referring additionally to FIGS. 5 and 6, annular lip 43 includes an annular end face 32 that serves as a bonding surface with a correspondingly shaped bonding surface, or annular end face 15, of cladding tube 14, as discussed in greater detail below.

Figure 4A:
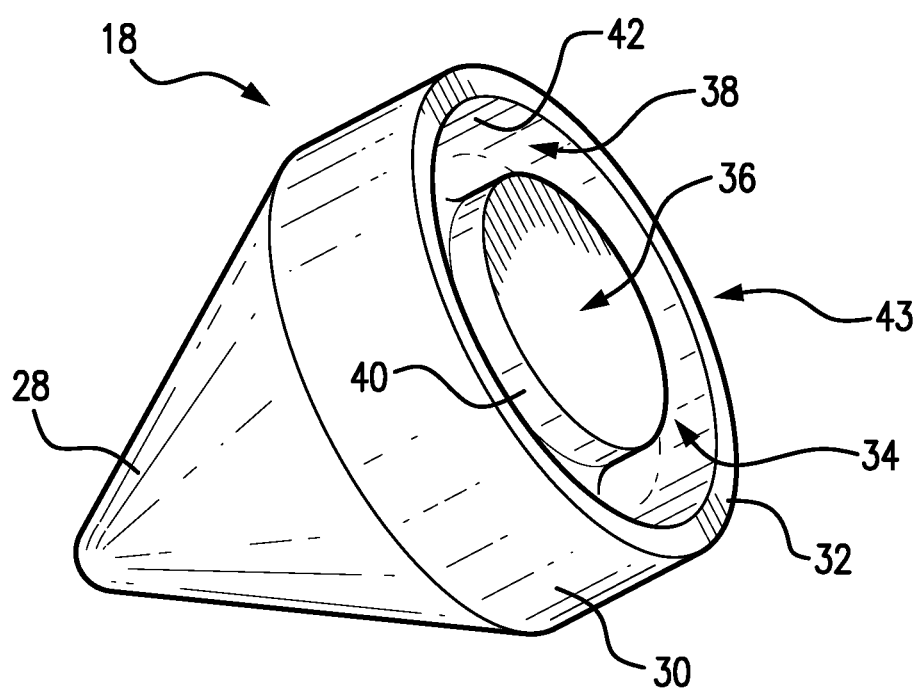
FIG. 4A is a perspective view of a tube end plug in accordance with an embodiment of the present disclosure.
Figure 4B:
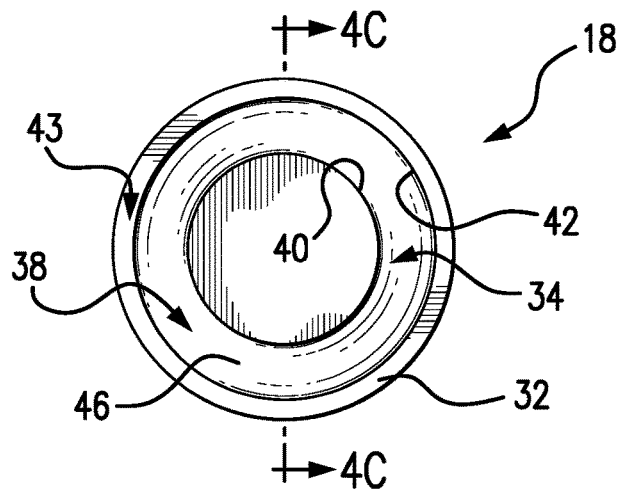
FIG. 4B is a rear view of the tube end plug as shown in FIG. 4A.
Figure 4C:
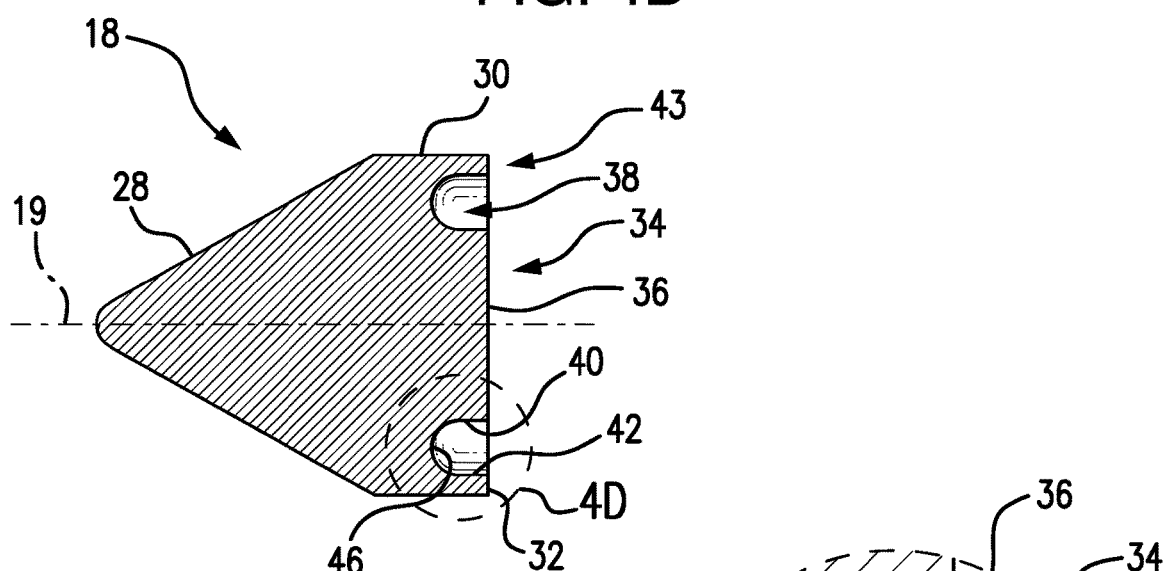
FIG. 4C is a cross-sectional view of the tube end plug as shown in FIG. 4B, taken along line 4C-4C.
Figure 4D:
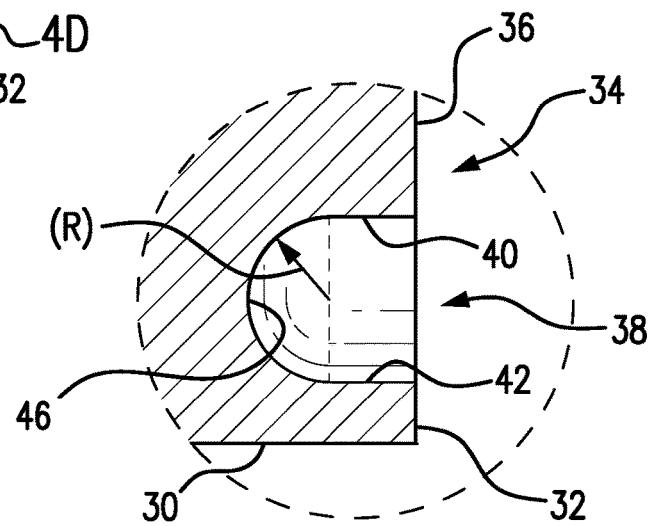
FIG. 4D is an enlarged cross-sectional view of a portion of the tube end plug as shown in FIG. 4C.

Referring specifically to FIG. 4D, annular undercut 38 preferably includes a cylindrical first inner wall 40, a cylindrical second inner wall 42, and a curved bottom wall 46 extending therebetween. First inner wall 40 and second inner wall 42 extend inwardly from rear face 36 of tube end plug 18, each terminating at a corresponding inner and outer peripheral edge of bottom wall 46. Both first inner wall 40 and second inner wall 42 are concentric to each other as well as to the cylindrical outer surface of main body portion 30, which is also concentric about longitudinal center axis 19. As such, first inner wall 40 and second inner wall 42 are substantially "straight," meaning they are not angled, slanted, or oblique with respect to the longitudinal center axis beyond known manufacturing tolerances. Bottom wall 46 is a surface that forms a continuous curve between first inner wall 40 and second inner wall 42. Moreover, as shown in FIG. 4D, the cross-sectional shape of bottom wall 46, in a plane that bisects tube end plug 18, is defined by a constant radius of curvature (R). This construction minimizes the potential for areas of stress concentration in the weld region of tube end plug 18 and cladding tube 14 as no sharp corners are defined within annular undercut 38.

In order to promote uniform heating of the portions of tube end plug 18 and cladding tube 14 that are within the resistance pressure weld region, annular end face 32 of tube end plug 18 and annular end face 15 of cladding tube 14 have both substantially the same shape and surface area. Note, however, in alternate embodiments the surface area of annular end face 32 of tube end plug 18 is greater than the surface area of annular end face 15 of cladding tube 14. This can be advantageous from a heat dissipation standpoint where one electrode is "hotter" than the other one. In those cases, the hotter electrode is frequently attached to the tube end plug because of its overall greater mass in the vicinity of the weld. The wider annular lip 43 provides a greater amount of material immediately adjacent the weld to dissipate heat on the plug side. In the embodiment shown, both annular end face 32 and annular end face 15 lie in a plane that is transverse to longitudinal center axis 19 of fuel rod 12. Additionally, both tube end plug 18 and cladding tube 14 are comprised of martensitic stainless steel, although other materials such as, but not limited to, 304 stainless steel, ODS alloys, etc., may be used in their construction.

With reference to FIGS. 5 and 6, an illustrative resistance pressure welding process is shown for welding lower tube end plug 18 to cladding tube 14. As noted above, lower end plug 18 preferably includes cone-shaped front end portion 28, cylindrical main body portion 30, as well as annular lip 43 and fuel seat 34, both of which are defined in part by annular undercut 38. Note, however, in alternate embodiments front end portion 28 may be rounded, flat, oblong, etc., rather than cone-shaped in cross-section. Annular lip 43 includes annular end face 32, which has both substantially the same shape and surface area as annular end face 15 of cladding tube 14. In short, annular end face 32 of tube end plug 18 has substantially the same inner diameter and outer diameter as does annular end face 15 of cladding tube 14, within known manufacturing tolerances for the assembly of fuel rods. Preferably, the outer diameters of cladding tube 14 and annular lip 43 of tube end plug 18 are in the range of 0.2" to 0.6" (5.1 mm to 15.2 mm) in diameter, although welding larger tubes is possible with higher currents.

Figure 11:
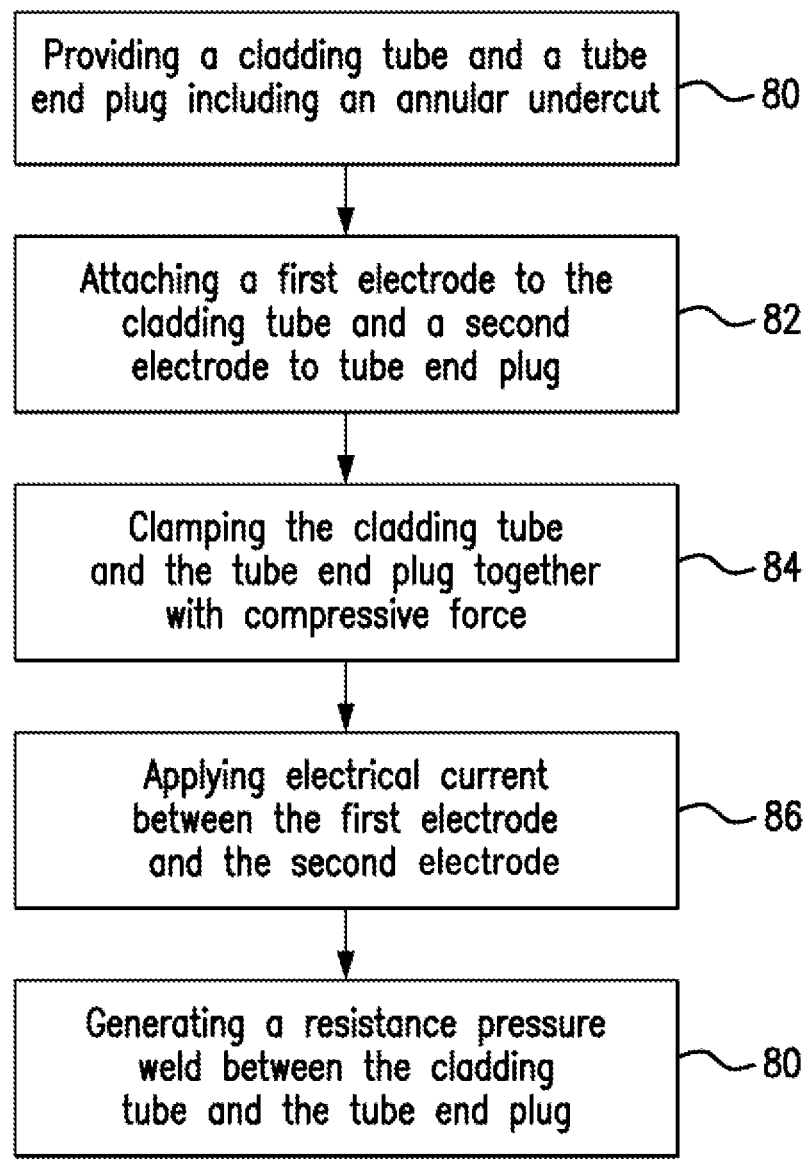
FIG. 11 is a flow diagram of a method of producing a resistance pressure weld in accordance with the embodiment of the invention shown in FIG. 5.

Referring now to FIGS. 5 and 11, a method of performing a resistance pressure weld between tube end plug 18 and cladding tube 14 is discussed. First, at step 80, a cladding tube 14 and a tube end plug 18 including an annular undercut 38 in accordance with the present disclosure are provided. Next, a first electrode 50 and a second electrode 52 are attached to each of cladding tube 14 and tube end plug 18, respectively, at step 82. As shown in FIG. 5, first electrode 50 is a clamshell-type electrode that clamps onto the end of cladding tube 14. In an alternate configuration, first electrode 50 can be sized to engage the end of cladding tube 14 with an interference fit between the first electrode and cladding tube 14, thereby securing cladding tube 14 in first electrode 50. Second electrode 52 can include a divot or other mating recess 54 that is configured to receive the front end portion 28 of lower end plug 18, which in the instant case is conical.

Figure 9:
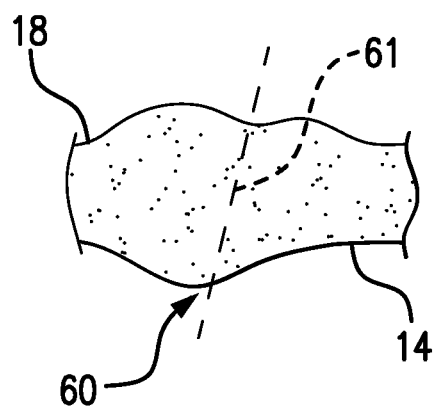
FIG. 9 is a partial cross-sectional view of the welded fuel rod shown in FIG. 6, showing the bond line between the fuel rod cladding tube and the tube end plug.
Figure 10:
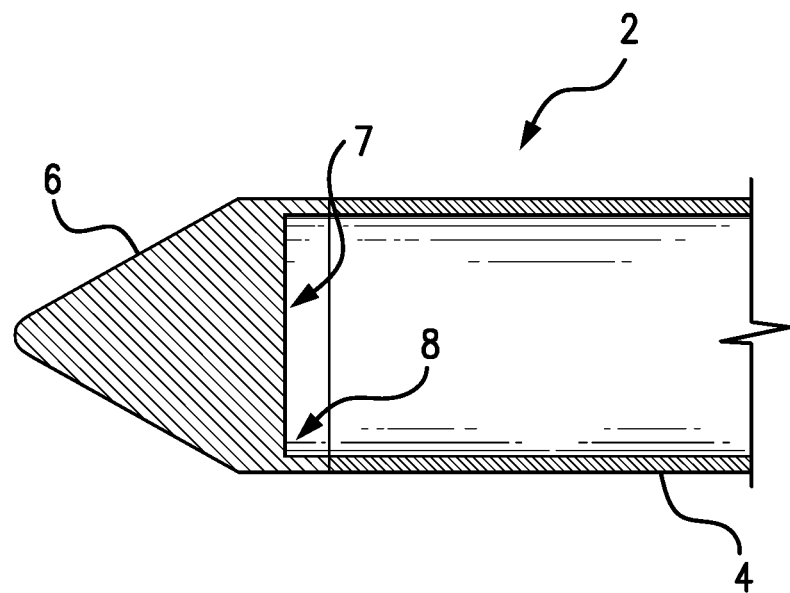
FIG. 10 is a cross-sectional view of a prior art tube end plug.

With cladding tube 14 and lower end plug 18 attached to their respective first and second electrodes 50 and 52, annular end face 15 of cladding tube 14 is clamped against annular end face 32 of lower end plug 18 at step 84. The clamping force is diagrammatically indicated in FIG. 5 by arrows (F). With the clamping force (F) applied, an electrical current is applied between first and second electrodes 50 and 52 that flows between cladding tube 14 and the lower end plug 18 while cladding tube 14 and end plug 18 are compressively loaded (step 86). Electrical resistance is expected to be highest at the interface of annular end faces 15 and 32 of cladding tube 14 and lower end plug 18, respectively. The resistance causes resistive heating of the mated annular end faces 15 and 32. The combination of the clamping force (F) and the applied electric current is effective to generate a pressure resistance weld 60 (FIG. 6) between the annular end faces 15 and 32 of cladding tube 14 and lower end plug 18. As best seen in FIG. 9, in the vicinity of pressure resistance weld 60, inner diameter and outer diameter weld upset of both cladding tube 14 and annular lip 43 of tube end plug 18 occurs, resulting in a bond line length (along dotted line 61) that is greater than the original interface length between end faces 32 and 15. To achieve this effect, the clamping force (F) is approximately 200-800 pounds in some embodiments, for example. The heating due to the electrical resistance at the tube end plug/cladding tube interface causes the metal to soften, thereby forming pressure resistance weld 60. Although alternating current can be applied with first and second electrodes 50 and 52, direct current is preferably used as it can be regulated over time to allow controlled preheating, welding, and post heating as compared to welding with alternating current.

Figure 7A:
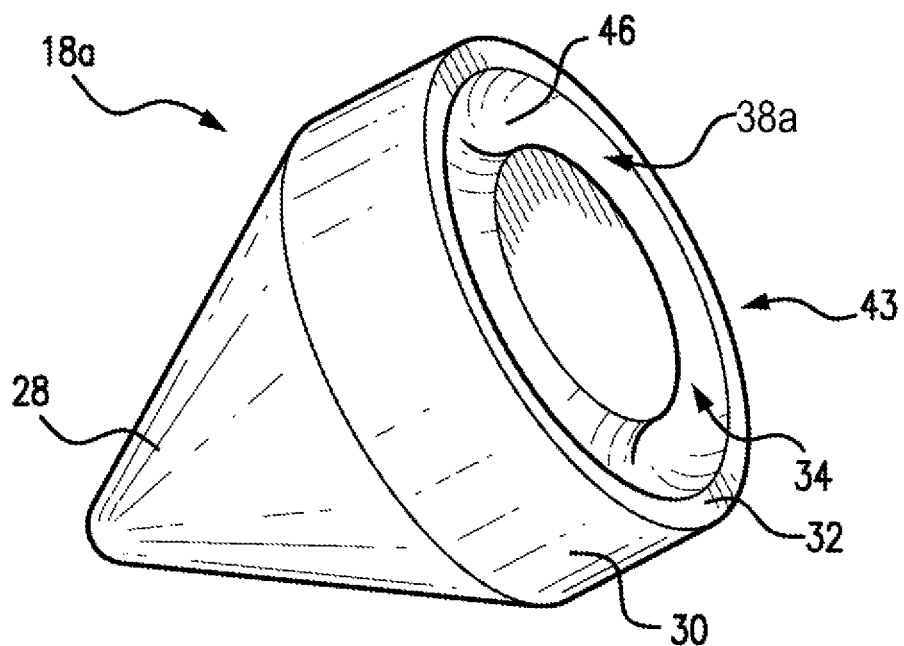
FIG. 7A is a perspective view of an alternate embodiment of a tube end plug in accordance with the present disclosure.
Figure 7B:
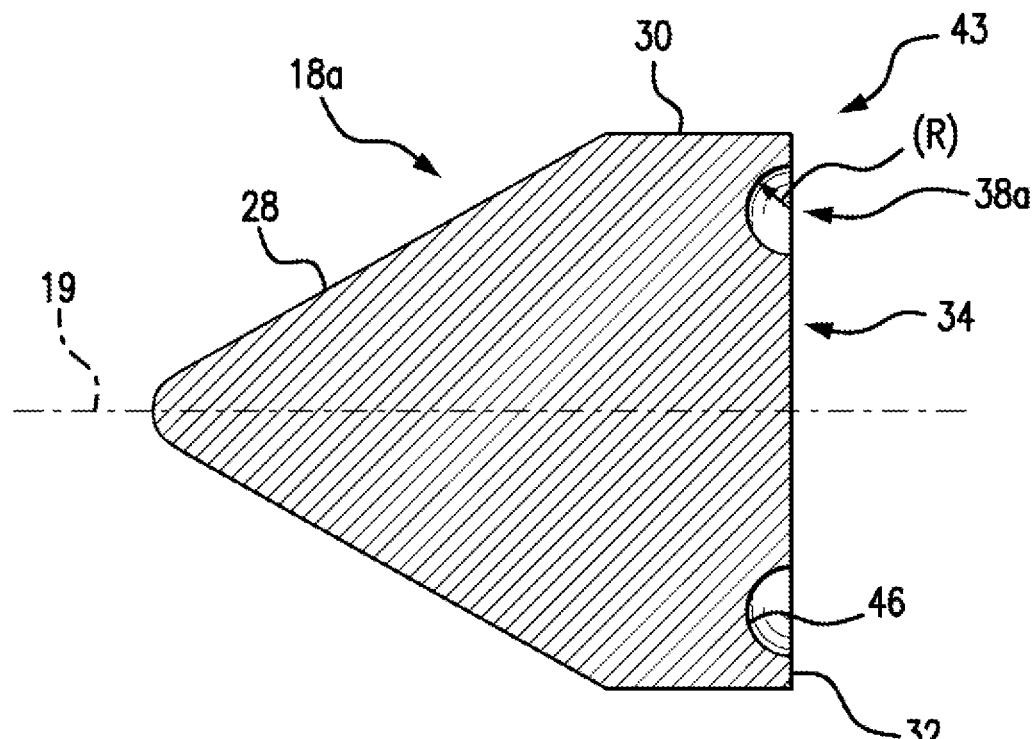
FIG. 7B is a cross-sectional view of the alternate embodiment of the tube end plug as shown in FIG. 7A.

Referring now to FIGS. 7A and 7B, an embodiment of a tube end plug 18a in accordance with an alternate embodiment of the present disclosure is shown. Tube end plug 18a differs only from the previously discussed embodiment shown in FIGS. 4A through 4D in that annular undercut 38a does not include cylindrical first and second inner walls 40 and 42. Rather, annular undercut 38a is defined solely by bottom wall 46 which, as before, is a continuously curved surface extending from its inner perimeter to its outer perimeter. Moreover, bottom wall 46 preferably has a cross-sectional shape, in a plane that bisects tube end plug 18a, that is defined by a constant radius of curvature (R). As such, similarly to the previously discussed embodiment, annular undercut 38a does not define any sharp corners in annular lip 43 that may contribute to stress concentrations due to the pressure resistance welding process.

Figure 8A:
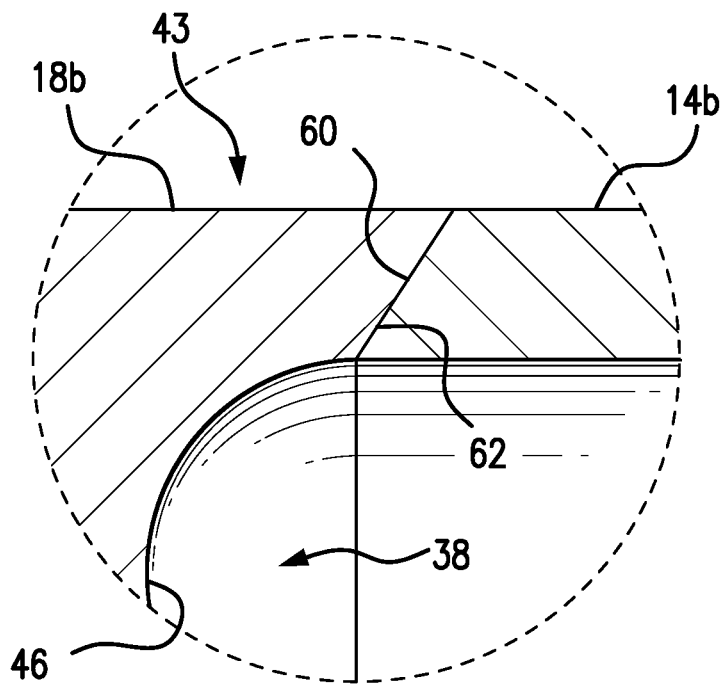
FIGS. 8A and 8B are partial, cross-sectional views of the abutment region of alternate embodiments of cladding tubes and tube end plugs in accordance with the present disclosure.

Referring to FIG. 8A, alternate embodiments of a lower tube end plug 18b and cladding tube 14b in accordance with the present disclosure are shown. Tube end plug 18b differs only from the embodiment shown in FIGS. 7A and 7B in that annular lip 43 includes an annular end face 60 that is defined by a frustoconical surface. Similarly, cladding tube 14b includes an annular end face 62 that is defined by a correspondingly shaped frustoconical surface 62. Similarly to the previously discussed embodiments of tube end plugs, annular end faces 60 and 62 of tube end plug 18b and cladding tube 14b, respectively, have surface areas that are substantially the same. Note, however, the frustoconical annular end faces 60 and 62 offer a greater surface area, and therefore area of contact between tube end plug 18b and cladding tube 14b, than does a pair or annular end faces that is transverse to longitudinal center axis 19 for the same wall thickness.

Figure 8B:
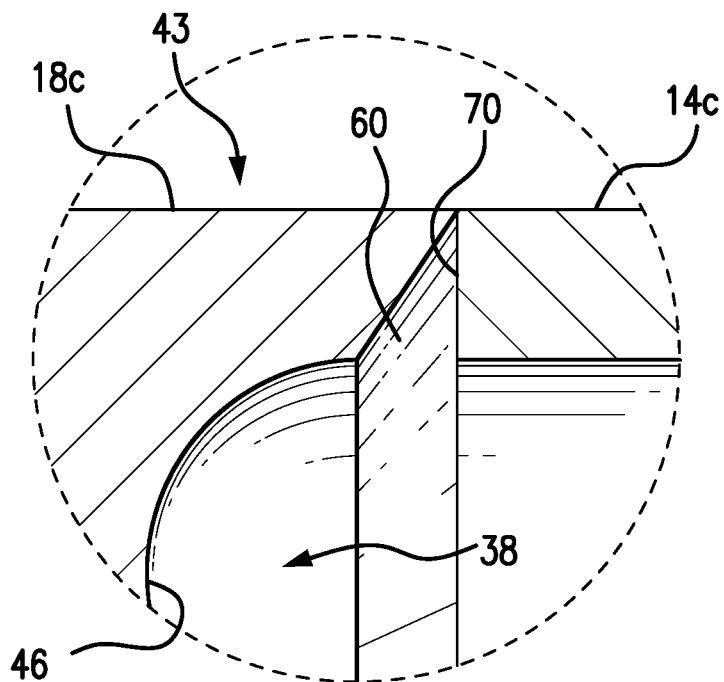

Referring now to FIG. 8B, alternate embodiments of a lower tube end plug 18c and cladding tube 14c in accordance with the present disclosure are shown. Tube end plug 18c differs only from the embodiment shown in FIGS. 7A and 7B in that annular lip 43 includes an annular end face 60 that is defined by a frustoconical surface. Cladding tube 14c includes an annular end face 70 that lies in a plane that is transverse to longitudinal center axis 19 of fuel rod 12. Note, although the surface area of annular end face 60 is greater than the surface area of annular end face 70, the wall thicknesses are substantially similar. Note, because annular end face 60 become thinner as it comes into contact with end face 70 of cladding tube 14c, an increased amount of material from the tube end plug's annular lip 43 is displaced as welding begins, as compared to the embodiment shown in FIGS. 7A and 7B. As such, contaminants that may be present on end faces 60 and 70 are likely to be displaced. Note, in alternate embodiments, the frustoconical surface defining annular end face 60 may be oriented so as to open radially outwardly.

While one or more preferred embodiments of the present invention have been described above, it should be understood that any and all equivalent realizations of the present invention are included within the scope and spirit thereof. Thus, the depicted embodiment(s) are presented by way of example only and are not intended as limitations on the present invention. For example, the annular end faces of the tube end plug and the cladding tube may be configured differently than those shown and described herein. Specifically, the end faces may have cross-sections that are V-shaped, concave, convex, polygonal, etc., and they need not be correspondingly shaped. It should be understood that aspects of the various one or more embodiments may be interchanged both in whole or in part. Therefore, it is contemplated that any and all such embodiments are included in the present invention as may fall within the literal or equivalent scope of the appended claims.

What is claimed is:

1. A method of performing a resistance pressure weld for a nuclear fuel rod, comprising the steps of:
   providing a cladding tube having a first end with an annular end face;
   providing a tube end plug including a front portion, a rear face, a cylindrical body portion extending therebetween, and an annular undercut extending from the rear face into the cylindrical body portion, thereby forming an annular lip having an annular end face;
   securing a first electrode to the first end of the cladding tube;
   securing a second electrode to the tube end plug;
   abutting the annular end face of the cladding tube to the annular end face of the tube end plug;
   applying compressive force to both the cladding tube and the tube end plug; and
   applying a direct electric current between the first and the second electrodes so that current flows between the cladding tube and the tube end plug,
   wherein the bottom wall of the annular undercut defines a continuous curve in a plane that both includes a longitudinal center axis of, and bisects, the tube end plug.

2. The method of claim 1, wherein the continuous curve of the annular undercut has a semi-circular cross-section having a constant radius of curvature.

3. A method of performing a resistance pressure weld for a nuclear fuel rod, comprising the steps of:
   providing a cladding tube having a first end with an annular end face;
   providing a tube end plug including a front portion, a rear face, a cylindrical body portion extending therebetween, and an annular undercut extending from the rear face into the cylindrical body portion, thereby forming an annular lip having an annular end face;
   securing a first electrode to the first end of the cladding tube;
   securing a second electrode to the tube end plug;
   abutting the annular end face of the cladding tube to the annular end face of the tube end plug;
   applying compressive force to both the cladding tube and the tube end plug; and
   applying electric current between the first and the second electrodes so that current flows between the cladding tube and the tube end plug,
   wherein the bottom wall of the annular undercut defines a continuous curve in a plane that both includes a longitudinal center axis of, and bisects, the tube end plug.

4. The method of claim 3, wherein the electric current applied between the first and the second electrodes is a direct current.

5. The method of claim 3, wherein the continuous curve of the annular undercut has a semi-circular cross-section having a constant radius of curvature.

* * * * *